July 31, 1962 — R. C. FISCHER — 3,046,720
FORAGE HARVESTER

Filed Jan. 12, 1959 — 3 Sheets-Sheet 1

INVENTOR
Raymond C. Fischer
ATTORNEY

July 31, 1962 R. C. FISCHER 3,046,720
FORAGE HARVESTER
Filed Jan. 12, 1959 3 Sheets-Sheet 2

INVENTOR
Raymond C. Fischer
Paul O. Pippel
ATTORNEY

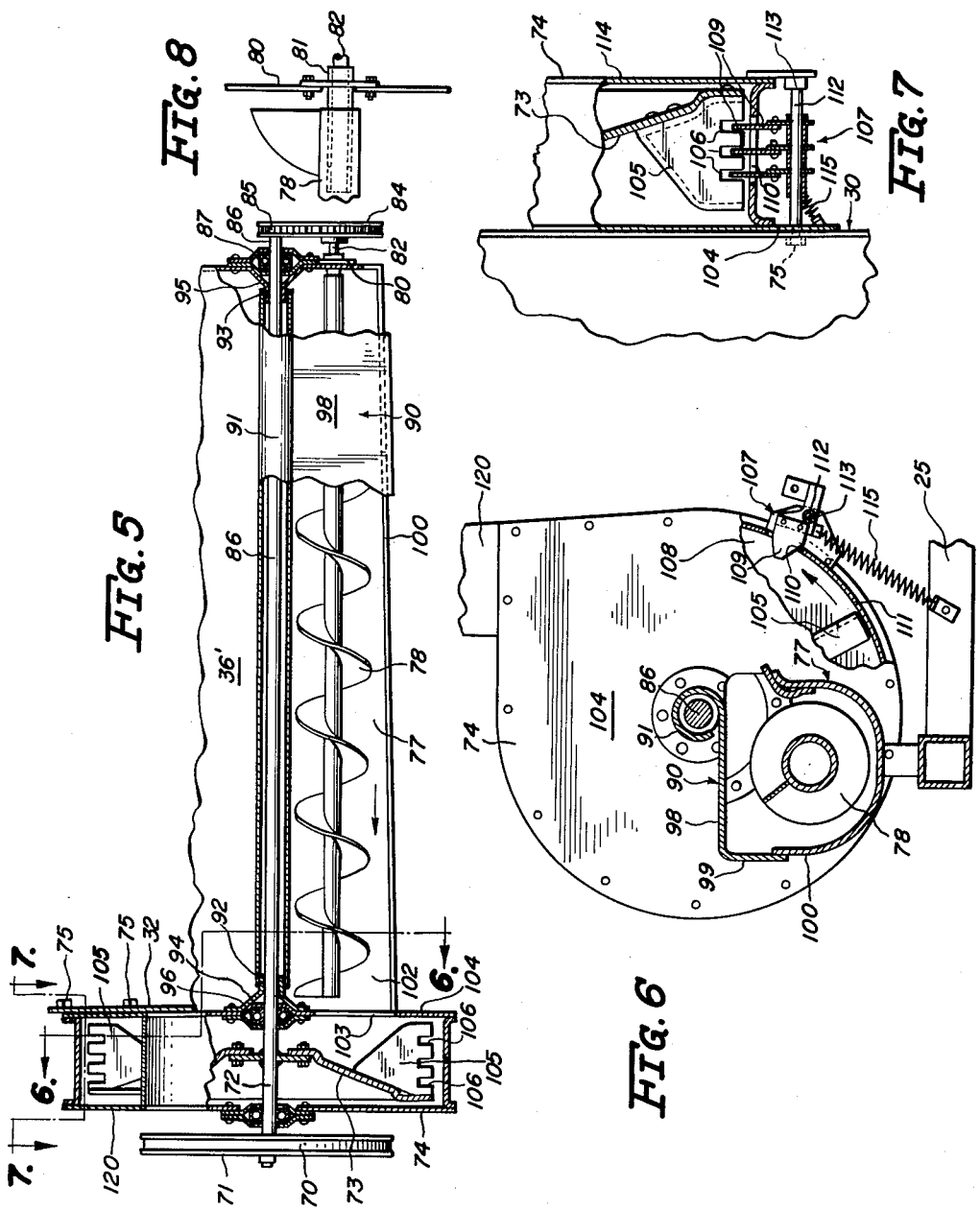

United States Patent Office

3,046,720
Patented July 31, 1962

3,046,720
FORAGE HARVESTER
Raymond C. Fischer, Hinsdale, Ill., assignor to International Harvester Company, Chicago, Ill., a corporation of New Jersey
Filed Jan. 12, 1959, Ser. No. 786,267
3 Claims. (Cl. 56—24)

This invention relates to harvesters and more particularly to a type commonly termed a utility harvester wherein the material is cut and conveyed by a rotary cutting unit.

The general object of the invention is to provide a novel, simplified and efficient harvester unit incorporating a basic housing of novel design which is alternatively usable with a chute structure whereby the material is thrown directly by the rotor into a trailing vehicle, or which mounts a combination auger and blower assembly wherein the rotor pitches the material into the auger which in turn directs it to the blower, the blower discharging the material through a suitable duct part into a trailing wagon.

A more particular object of the invention is to provide a novel drive arrangement for the component parts such that a minimum number of parts is required for the direct throw machine and which serves as a basic drive means for the auger-blower conveyor attachment.

A still further object of the invention is to provide a novel housing structure which enhances the blow of the material to obtain an adequate pitch therefor so that the machine will function easily and be entirely free from clogging.

Another object of the invention is to provide a ground wheel and frame arrangement wherein the left wheel is located forward of the right wheel thereby carrying more of the implement weight and greatly reducing the weight carried on the tractor drawbar; and so the wheels can be moved farther forward by rotating supporting cranks 180° to further reduce the drawbar load, and provide more accurate gauging of cutting height by approximately aligning the outer wheel with the rotor.

A further object is to provide a machine that will chop the material shorter by providing two knives per revolution of the rotor assembly, and supplementary knives in the blower housing of the blower model.

These and other objects of the invention will become more apparent from the specification and the drawings, wherein:

FIGS. 3 through 8 illustrate the invention as assembled in a combination auger-blower unit;

Figure 3:
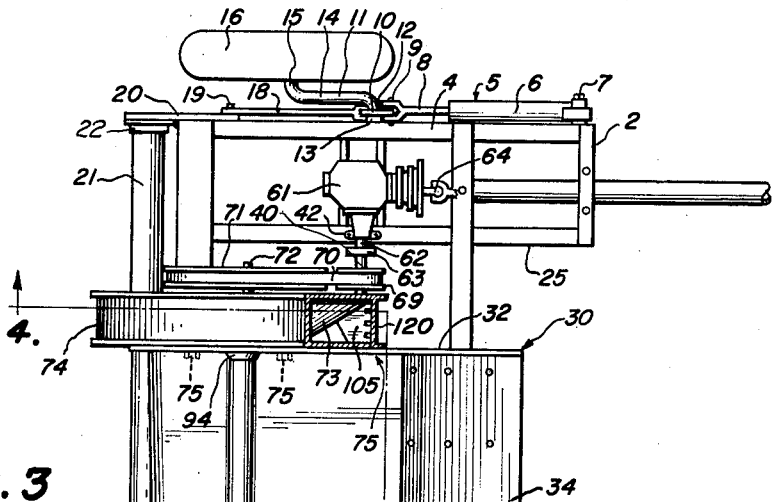
Figure 9:
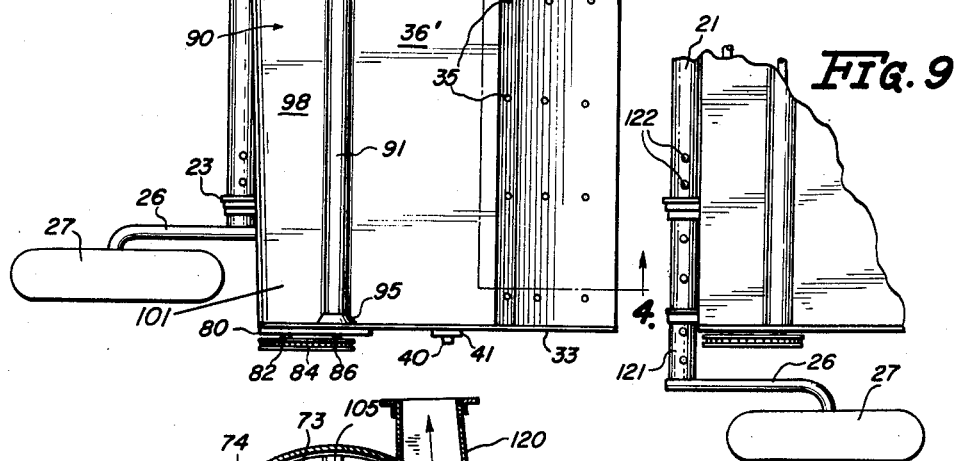
Figure 4:
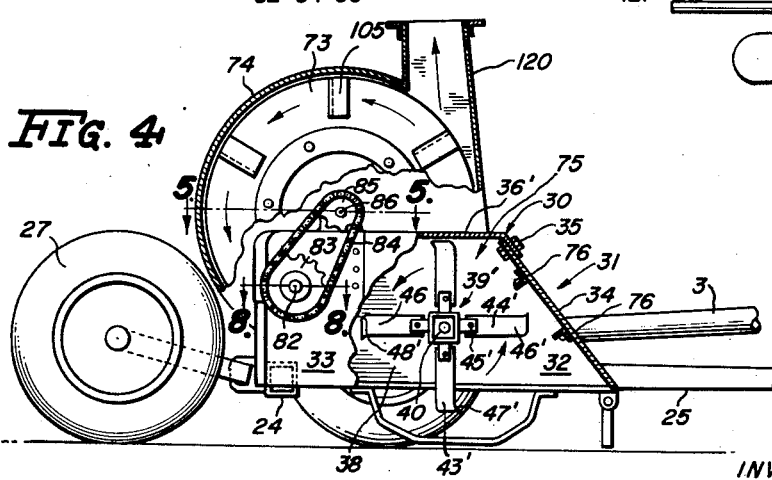

FIG. 3 being a plan view partially in horizontal section;

FIG. 4 being a transverse vertical sectional view taken substantially in the planes indicated by the line 4—4 of FIG. 3;

FIGURE 5 being an enlarged fragmentary horizontal sectional view taken essentially on the line 5—5 of FIG. 4;

FIG. 6 being a transverse vertical sectional view taken substantially on the line 6—6 of FIG. 5;

FIG. 7 being a fragmentary enlarged sectional view of a portion of the blower taken substantially on the line 7—7 of FIG. 5;

FIG. 8 being a fragmentary enlarged sectional view taken substantially on the line 8—8 of FIG. 4; and FIG. 9 is a fragmentary plan view comparable to a portion of FIG. 3 but illustrating a different form of wheel mounting.

Figure 2:
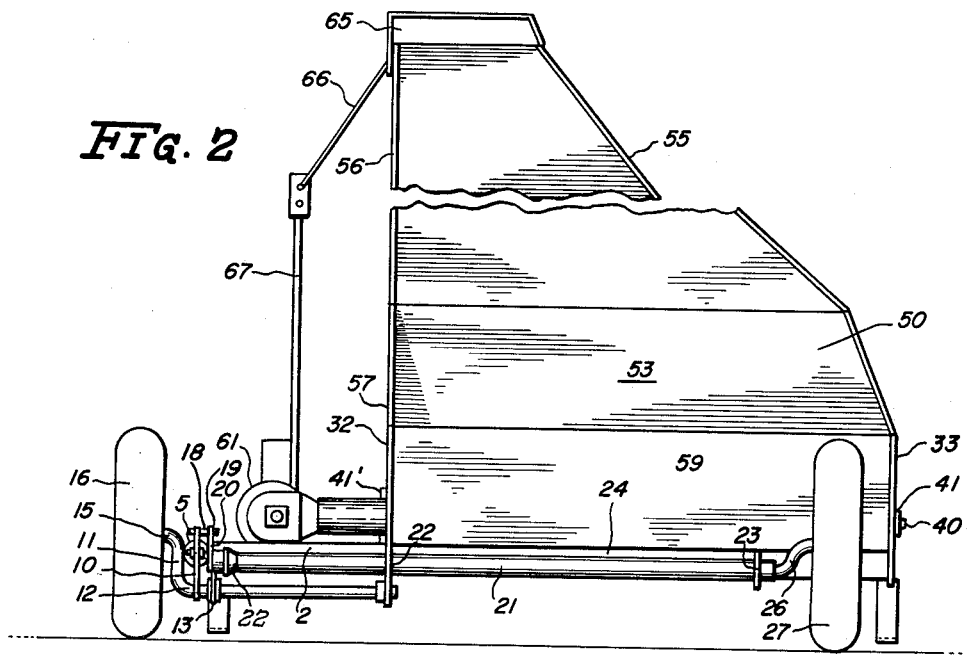
FIG. 2 is a fragmentary rear view of the structure shown in FIG. 1.
Figure 1:
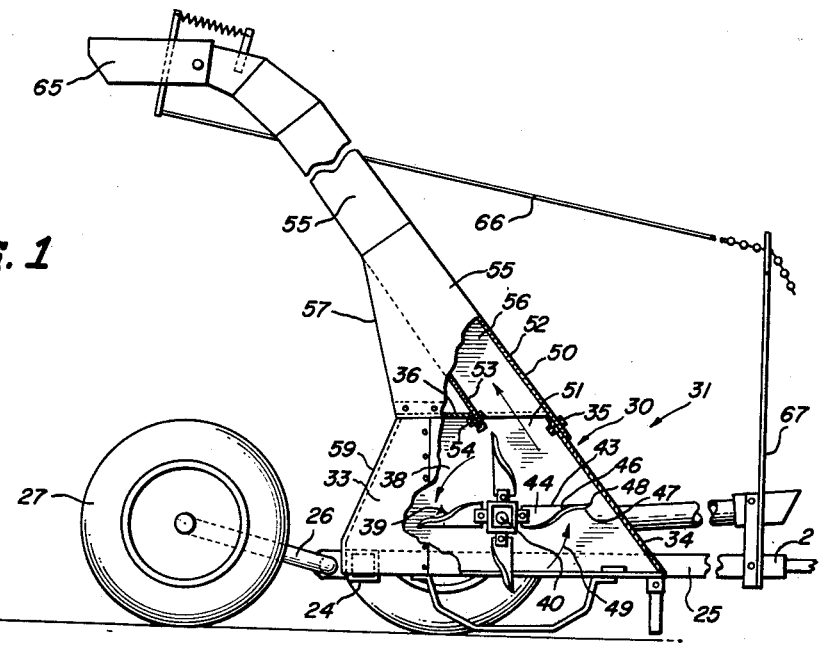
FIG. 1 is a side elevational view, partially in vertical section and with parts broken away, illustrating the novel harvester as assembled in a direct throw machine.

Describing the invention in detail and having particular reference to FIGS. 1 and 2 of the drawings, there is shown an ambulatory frame 2 which has a forwardly extending hitch frame 3 for connection to an associated towing vehicle such as a tractor, as will be readily understood by those skilled in the art. The frame 3 supports along one side 4 a hydraulic unit in the form of a ram 5 which has its cylinder 6 anchored as at 7 to the frame 2, the cylinder 6 having a piston stem 8 extending rearwardly therefrom, the stem 8 being pivotally connected as at 9 to intermediate the ends of a lever 10 which is connected at its lower end to a crank-like wheel support 11, the support 11 being suitably journalled on its horizontal shaft portion 12 from bearing means 13 mounted on the frame 2. The shaft portion 12 is connected to the arm portion 14 which at its other end is connected to the outwardly extending shaft portion or spindle 15 which suitably mounts the wheel 16. It will be appreciated that rotation of the wheel assembly about its shaft portion 12 by means of extension and retraction of the ram raises and lowers the supported side of the framework.

The piston stem 8 is also connected through lever 10 to the forward end of a rod 18, the rear end of which is pivoted as at 19 to an arm 20 which is connected to a tube 21 for rotating the latter within the bearing supports 22 and 23 which are fastened to a transverse beam member 24 secured to the rectangular fore-and-aft extending frame portion 25 of the framework 2. The other end of the rockshaft structure 21 is connected to a crank 26 which mounts the wheel 27.

The housing generally designated 30 of the harvester 31 fits within the corner space defined between the forwardly extending frame structure 25 and the transversely extending rear beam member 24 and comprises inboard and outboard upright generally parallel fore-and-aft extending walls or panels 32, 33 between which and to which is connected a downwardly and forwardly sloping forward wall 34, the wall 34 being disposed at an inclination of between 35° and 55° in the stalk cutter model. It will be seen that the structure presents a somewhat truncated-pyramidal shape including the flat forward wall 34 and the flat upright side walls 32 and 33 as well as the substantially flat top wall 36 and these walls define a downwardly open cavity 38 within which is disposed a transversely extending rotor structure generally designated 39.

The rotor structure 39 has a generally horizontal transversely extending center shaft structure 40 which at its ends is supported in suitable bearings 41, 41' and carried and mounted on the walls 33 and 32 respectively and bearing structure 42 also being mounted upon the framework 25. The center shaft 40 pivotally carries a plurality of outwardly extending swingable hammers or blades 43 which due to centrifugal action are adapted to extend outwardly.

As best seen in FIG. 1, the knives 43 each comprise a flat shank portion 44 which extends radially with respect to the shaft structure 40 edgewise to the direction of cutting the crops and intermediate its end the shank portion is twisted to provide a fan or impeller blade portion 46 which is approximately at right angles to the shank portion 44, the twist bending for approximately the full width of the shank portion 44 and terminating in an outer extremity 47 which is provided with a sharp cutting edge 48 for cutting the material as the rotor is rotated with its forward side moving upwardly in the direction of the arrow as indicated at 49 as the unit is progressed along a field whereby the material is caused to sling upwardly into the discharge chute 50 which projects diagonally upwardly and rearwardly from the upper side of the housing 30.

As best seen in FIG. 1, the top plate generally designated 36 terminates short of the front wall 34 whereby defining an opening therewith to which communicates the aforementioned duct 50 which has its forward wall 52 fastened to the upper edge of the wall 34 by bolts 35 and the back wall 53 being fastened to an inclined downwardly projecting lip 54 on the forward edge of the top portion 36. The side panels 55 and 56 of the pipe structure or duct structure which converges upwardly may be provided with suitable anchor plates 57 which may be united with the top wall 36 in any suitable manner.

In the embodiment of FIGS. 1 and 2 the back side of the unit may be enclosed by a back wall 59 suitably connected to the lateral walls 32 and 33 and rear edge of wall 36.

Of specific importance to the invention is the provision of a drive for the rotor shaft 40 and this drive includes a gear box 61 suitably anchored and bolted or otherwise connected to the frame structure portion 25, the said gear box 61 having an output shaft 62 in axial alignment with the adjacent end of the shaft 40 and connected thereto as by a coupling 63. The gear box has a forwardly extending input shaft 64 which is connectable to an associated tractive vehicle such as the power take-off of a tractor (not shown), as will be readily understood by those skilled in the art. Thus, it will be seen that drive for the direct throw machine wherein the material is discharged through the duct 55 and controlled by the deflector 65 which is positionable by the control assembly 66 carried by the standard 67 from the framework 25, is direct thereto.

Referring to the embodiment shown in FIGS. 3 through 8 the drive takes the form of mounting a sheave or a pulley 69 on the shaft 62 and driving through a belt 70 to a sheave 71 which drives the shaft 72 which mounts the flywheel rotor impeller assembly 73, the assembly 73 being enclosed within the housing 74 which is connectable by bolts 75 to the inboard wall 32 of the basic housing structure 30. In this embodiment it will be seen that the top wall 36 of the previous embodiment as shown in FIG. 1 is substituted for by the wall 36' which connects and extends over the upper edge of he forward wall 34 and bolted thereto by bolts 35, the wall 36' functioning to guide the material which moves over the top of the rotor, after it is shredded against the transversely extending shear bars 76 mounted on the forward wall 34, into the auger trough generally designated at 77.

The auger trough 77, as best seen in FIGS. 5 and 6, underlies the auger 78 which extends generally parallel to the rotor rearwardly thereof, said trough and blower housing being a unitary structure adapted to be mounted on the rear of the housing 30. The outboard end of the trough is provided with a plate structure 80 which mounts the bearing sleeve 81 (FIG. 8) which extends inwardly into the trough and supports the auger 78 through its drive shaft 82, the drive shaft being connected to a sprocket 83 which is driven by a chain 84 which is driven by a sprocket 85 which is connected to the adjacent end 86 of shaft 72 which is carried by bearing 87 adjacent to the sprocket 85, the bearing being mounted on the plate 80. The shaft 72 extends generally parallel to the auger through the blower. It will be noted that the shaft structure 72 is disposed to provide a hinging axis for the cover 90 which has a rolled tubular forward edge portion 91 sleeved over the shaft 72 in shielding relationship thereto and rotatable about the axial extensions 92 and 93 (FIG. 5) on the bearing cups 94 and 95 that are provided to support the bearings 87 and 96 adjacent to opposite ends of the shaft 72. The cover 90 comprises the top plate portion 98 which overlies the auger 78 and a downwardly projecting rear flange portion 99 which overlaps the upstanding rear edge portion 100 of the auger trough 77.

Having particular reference to FIG. 5 of the drawings, it will be noted that the auger trough at its delivery or discharge or first end 102 is broader than at its outboard or second end 101 and that it tapers or gradually broadens out toward the blower housing and discharges through the opening 103 in the inboard wall 104 of the blower housing. It will be seen that the paddles 105 of the blower are serrated or slotted at 106 and cooperate with a spring-loaded knife assembly 107 (FIG. 6) which is spring biased into the housing cavity 108, the knife assembly 107 comprising a plurality of triangularly shaped blades 109 spaced axially of the housing and projecting through an opening 110 therein in the circumferential wall 111 thereof. The knife assembly comprises the knives 109 which in the present instance are shown as three in number which are fixed to a holder structure 112 which is pivoted on a pivot support 113 which extends through and is connected to the inboard and outboard walls 104 and 114 of the housing. There is provided a spring 115 which is connected between the bracket sleeve structure 112 and an adjacent portion of the framework 25, the spring serving to rotate the knife assembly in a direction urging the blades 109 into the housing and being releasable against the resistance of the tension or extension of the spring 115 to accommodate yielding of the knife assembly in the housing in the event of obstruction occurring between the blades or paddles 105 and the knife blades. The blades serve to shred the material in order to cut it into finer lengths. Of course, this feature may be eliminated if the length of cut as performed by the rotor knife blades is adequate.

It will be observed that blades 43' shown in the embodiment of FIGS. 3 through 8 comprises a shank portion 44' which is pivoted at 45' to the shaft structure 40, the outer end portion 46' being bent transversely and provided with sharp leading and trailing edges 47' and 48', as will be readily understood by those skilled in the art. In the present embodiment rotation of the rotor cuts the material and advances it along the wall 34 under the top plate 36' into the trough and the auger moves the material into the blower. The blower of course moves the material up through the discharge 120 through a spout (not shown) into the associated vehicle.

Referring now to the embodiment of FIG. 9, it will be seen that there is provided an extension 121 which telescopes into the tube 21 and is conencted thereto as by bolts 122, the arm 26 of the wheel 27 being directed forwardly on the outboard side of the machine. In this embodiment, of course, the inboard wheel would also have to be turned so that it extends forwardly of its axis of pivot so that movement of the ram in its connection to the two wheels would have the effect of raising and lowering the unit.

What is claimed is:

1. A forage harvester of the type having an elongated crop cutting and collecting rotor, a screw conveyor alongside and substantially coextensive with said rotor, and a rotary impeller adjacent one end of said rotor and conveyor, said conveyor having a discharge end adjacent said impeller, and the opposite end of said conveyor mounted for unitary support on said harvester, and drive means extending from said impeller to said opposite end of said conveyor and providing driving connection therebetween.

2. The invention according to claim 1 and said drive means comprising a shaft, and a housing for the rotor and conveyor having a cover hinged about said shaft.

3. The invention according to claim 1 and said drive means comprising a shaft, and a housing for the rotor and conveyor having a cover hinged about said shaft, and said shaft extending generally parallel to the rotor behind the same.

References Cited in the file of this patent

UNITED STATES PATENTS

| | | |
|---|---|---|
| 2,064,689 | Russwurm et al. | Dec. 15, 1936 |
| 2,620,717 | Silver et al. | Dec. 9, 1952 |
| 2,669,271 | Treckmann | Feb. 16, 1954 |
| 2,704,021 | Brundage | Mar. 15, 1955 |
| 2,795,912 | Skromme | June 18, 1957 |
| 2,836,023 | Caldwell | May 27, 1958 |
| 2,836,027 | Pearson | May 27, 1958 |
| 2,871,643 | McClellan | Feb. 3, 1959 |